United States Patent
Ramanathan

[11] 3,929,785
[45] Dec. 30, 1975

[54] POLYCYCLIC N-HETERO DYESTUFFS
[75] Inventor: Visvanathan Ramanathan, Basel, Switzerland
[73] Assignee: Ciba-Geigy AG, Basel, Switzerland
[22] Filed: Apr. 8, 1974
[21] Appl. No.: 458,924

[30] Foreign Application Priority Data
Apr. 13, 1973 Switzerland............... 5336/73

[52] U.S. Cl..... 260/248 AS; 260/249.5; 260/243 R; 8/178 R; 8/54; 8/177 R; 8/179; 260/247.5 C; 260/156
[51] Int. Cl.²........................ C07D 253/08
[58] Field of Search....... 260/248 AS, 249.5, 243 R, 260/247.5 C

[56] References Cited
UNITED STATES PATENTS
3,637,687  1/1972  Chow............................ 260/249.5 X
3,720,671  3/1973  Kaupp et al. .................. 260/249.5

*Primary Examiner*—John M. Ford
*Attorney, Agent, or Firm*—Joseph G. Kolodny; Edward McC. Roberts; Prabodh I. Almaula

[57] ABSTRACT

Polycyclic compounds of the general formula I

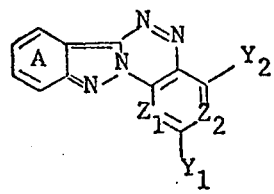

(I)

in which the nucleus A can be substituted yet further, amongst $Z_1$ and $Z_2$ one Z is a nitrogen atom —N= and one Z is a group of the formulae

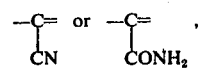

both Y are identical or different optionally substituted amino groups of the formulae

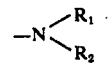

or groups of the formulae —S—$R_3$ or —O—$R_4$, and $Y_2$ can be an alkyl or aryl radical, preferably a methyl radical, $R_1$, $R_2$, $R_3$ and $R_4$ each denoting hydrogen, aryl, aralkyl, cycloalkyl or an acyclic aliphatic radical and $R_1$ and $R_2$ being able to form a ring containing the amine nitrogen, and their mixtures with one another. The dyestuffs give fast yellow shades on polyester or polyacrylic fibers or on wool and synthetic polyamides.

12 Claims, No Drawings

POLYCYCLIC N-HETERO DYESTUFFS

The present invention relates to new polycyclic compounds, processes for their manufacture, the use of the new polycyclic compounds for dyeing or printing organic material, especially the use of the sparingly water-soluble polycyclic compounds as disperse dyestuffs for dyeing or printing hydrophobic organic fibre material and, as an industrial product, the material dyed or printed with the new polycyclic compounds.

New, valuable polycyclic compounds have been discovered, which correspond to the general formula I

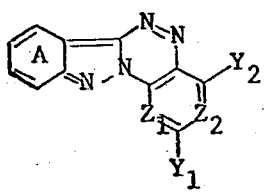  (I)

in which the nucleus A can be substituted yet further, amongst $Z_1$ and $Z_2$ one Z is a nitrogen atom -N= and one Z is a group of the formulae

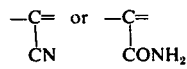

both Y are identical or different optionally substituted amino groups of the formulae

or groups of the formulae $-S-R_3$ or $-O-R_4$, and $Y_2$ can be an alkyl or aryl radical, preferably a methyl radical, $R_1$, $R_2$, $R_3$ and $R_4$ each denoting hydrogen, aryl, aralkyl, cycloalkyl or an acyclic aliphatic radical and $R_1$ and $R_2$ being able to form a ring containing the amine nitrogen.

These new polycyclic compounds of the general formula I are obtained when the diazonium compound of an amine of the formula II

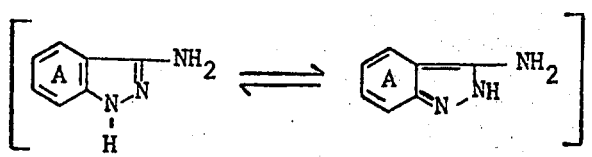

(II)

in which the nucleus A has the meaning indicated under the formula I, is coupled with a pyridine compound of the formula III

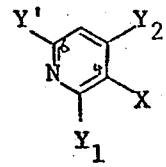  (III)

in which X denotes the $-CN$ or $-CONH_2$ radical, $Y'$ denotes an optionally alkylated amino group and $Y_1$ and $Y_2$ have the meaning indicated under the formula I, to give an azo compound of the formula IV

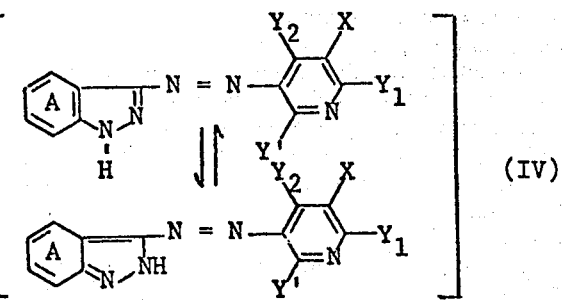  (IV)

and the coupling product is reacted, with elimination of YH and cyclisation, to give a polycyclic compound of the formula I.

Possible substituents of the nucleus A are in particular: The nitro group, halogen, lower alkyl groups, lower alkyloxy groups or the sulphonic acid group, As hydrocarbon radicals, $R_1$, $R_2$, $R_3$ and $R_4$ represent, for example, straight-chain or branched alkyl groups with up to 12, preferably 1 to 6, carbon atoms, cycloalkyl groups, such as the cyclohexyl group, aralkyl groups, especially phenylalkyl groups, such as the benzyl group, and carbocyclic aryl groups, such as phenyl or naphthyl groups.

Aliphatic hydrocarbon radicals $R_1$, $R_2$, $R_3$ and $R_4$ can be substituted, for example by hydroxyl or nitrile groups, lower alkoxy groups with, preferably, 1 to 4 carbon atoms, acyloxy groups, phenoxy groups or halogens, such as chlorine or bromine. Methyl, ethyl, propyl, butyl, hexyl, $\beta$-ethylhexyl, $\beta$-hydroxyethyl or propyl, $\gamma$-hydroxypropyl, $\omega$-hydroxyhexyl, $\beta$-methoxyethyl, $\gamma$-methoxypropyl, $\beta$-ethoxyethyl, $\gamma$-ethoxypropyl, $\gamma$-iso-propoxypropyl, $\gamma$-butoxypropyl, $\beta$-aminoethyl, $\gamma$-dimethylaminopropyl, $\gamma$-dibutylaminopropyl or $\omega$-aminohexyl, as well as the radicals of the formulae $$CH_2CH_2OCH_2CH_2OH,$$
$$CH_2CH_2CH_2OCH_2CH-C_4H_9$$
$$|$$
$$C_2H_5$$

or $CH_2=CH-CH_2$, may be mentioned individually.

Possible acyl radicals are, for example, fatty acid radicals with up to 5 carbon atoms, such as formyl, acetyl, propionyl and butyryl radicals; alkylcarbamyl radicals with up to 5 carbon atoms, such as methylaminocarbonyl, ethylaminocarbonyl, propylaminocarbonyl or butylaminocarbonyl radicals; alkoxycarbonyl radicals with up to 5 carbon atoms, such as methoxycarbonyl, ethoxycarbonyl, propoxycarbonyl or butoxycarbonyl radicals; phenylcarbamyl or phenoxycarbonyl radicals, and benzoyl, phenoxyacetyl, chloroacetyl or phenylacetyl radicals.

If substituents of the pyridine ring contain benzene rings which are substituted further, then these can also contain the substituents listed for the nucleus A, but especially halogens, such as fluorine, chlorine or bromine, sulphonic acid groups, lower alkyl or lower alkoxy groups or phenyl groups.

Particularly valuable disperse dyestuffs are polycyclic compounds according to the invention, of the formula I, which are free of groups which dissociate in water to give an acid reaction and confer solubility in water, the nucleus A in the polycyclic compounds being substituted by nitro groups or halogens, such as chlorine.

In preferred polycyclic compounds of the formula I the radicals Y are identical or different groups of the formulae

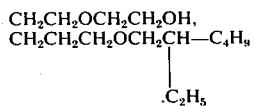

wherein $R_1$ and $R_2$ have the abovementioned meaning.

If the nitrogen atom present on the dyestuff forms a hetero-ring together with the substituents $R_1$ and $R_2$, this ring is preferably 5-membered to 6-membered and non-aromatic; it can be, for example, the pyrrolidone or piperidine ring and — if this ring includes a further hetero-atom — it can be, for example, the morpholine radical or a piperazine ring which is optionally N'-substituted, especially by alkyl groups, such as the N'-methylpiperazino, N'-ethylpiperazino or N'-acetylpiperazino radical, or a radical of the formula

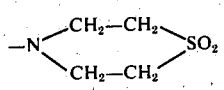

Suitable diazo components of the formula II for carrying out the process according to the invention are, for example, optionally substituted 3-aminoindazoles, such as 3-aminoindazole, 3-amino-5- or -6-nitro-indazole, 3-amino-4-or -5-methylindazole, 3-amino-4,6-dimethylindazole, 3-amino-4-or -5-methoxyindazole, 3-amino-4-, -5- or -6-chloroindazole, 3-amino-5- or 6-bromo-indazole, 3-amino-5-methoxy-6-chloroindazole and 3-amino-indazole-5-sulphonic acid.

The pyridine compounds which according to the invention can be used as coupling components of the formula III can be manufactured, for example, by reaction of 2-bromo-3-cyano-4,6-diaminopyridine with a primary or secondary amine or a hydroxyl or mercapto compound.

As examples of amines there may be mentioned: Naphthylamine, aniline and its derivatives, such as 1-amino-3-chlorobenzene, 1-amino-4-carbethoxybenzene, 1-amino-2,4-dicyanobenzene, 1-amino-2-methoxy-4-nitrobenzene, 1-amino-2-methanesulphonyl-4-chlorobenzene, methylamino-benzene, ethylaminobenzene and 1-methylamino-3-chlorobenzene, primary and secondary aliphatic amines, such as methylamine, ethylamine, isopropylamine, decylamine, tert.-butylamine, isoamylamine, n- or i-hexylamine, n- or i-octylamine, 2-ethylbutylamine, 2-ethylhexylamine, cyclohexylamine, $\beta$-hydroxyethylamine, $\beta$-hydroxypropylamine, $\gamma$-hydroxypropylamine, $\omega$-hydroxyhexylamine, $\beta$-methoxyethylamine, $\beta$-ethoxyethylamine, $\beta$-butoxyethylamine, $\gamma$-($\beta'$-ethylhexoxy)-propylamine, $\beta$-($\beta'$-hydroxyethoxy)-ethylamine, $\gamma$-ethoxypropylamine, $\gamma$-methoxypropylamine, $\gamma$-isopropoxypropylamine, $\gamma$-amino-$\alpha$-N-methylaminopropane, $\gamma$-amino-$\alpha$-N-dimethylaminopropane, $\alpha$-amino-$\beta$-diethylaminoethane, $\beta$-amino-$\beta$-ethyl-$\alpha,\gamma$-propanediol, $\beta$-amino-$\beta$-methylpropanol, N-ethyl-N-($\beta$-hydroxyethyl)-amine, diethanolamine, dimethylamine, diethylamine, dipropylamine, N-methyl-N-($\beta$-hydroxy-ethylamine, morpholine, piperidine, piperazine, N-methyl-piperazine, pyrrolidine, thiomorpholine-S-dioxide, $\beta$-aminoethyl-thiomorpholine-S-dioxide, N-($\gamma$-aminopropyl)-pyrrolidone, chloroethylamine, chlorobutylamine or benzylamine.

Amines of the formulae (lower alkyl)$_2$N-lower alkylene-NH$_2$ and (lower alkyl)$_2$N-phenylene-NH$_2$ are particularly valuable for the manufacture of quaternised dyestuffs.

The halogenoalkylamino groups already introduced can subsequently be reacted with tertiary amines, such as pyridine or N,N-dimethylhydrazine.

As examples of alcohols there may be mentioned: Ethanol, propanol, isopropanol, butanol, 2-ethoxyethanol, cyclohexanol, benzyl alcohol, phenol and its substituted derivatives.

Examples of mercapto compounds are ethylmercaptan and thiophenol.

The starting products, especially the diaminohalogenopyridines, are obtainable, for example, according to Boldt et al., Angew. Chemie, volume 82 (1970), page 392; W. J. Middleton, U.S. Patent 2,790,806; A. L. Cassey et al., Angew, Chemie, volume 84 (1972), page 1183; and Sasaki et al., Tetrahedron Letters 1971, page 4,593 (compare also Yokoyama Bull. Chem. Soc. Japan, volume 44 (1971), page 3,195).

The 3-cyano group can be converted by saponification in concentrated sulphuric acid into the 3 —$CONH_2$ group, Preferred starting materials are coupling components of the formula

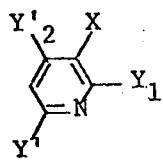

wherein $Y'$ and/or $Y'_2$ denote a tertiary amino group, especially a di-lower alkylamino group, Another group of valuable starting products is that of the formula

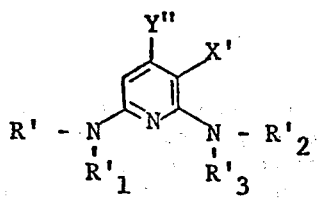

in which $Y''$ denotes an alkyl or aryl radical, preferably a methyl group, $X'$ denotes nitrile or carboxylic acid amide, $R'$ denotes hydrogen, alkyl with 1 to 8 carbon atoms, alkyl which is optionally substituted by hydroxy, alkoxy with 1 to 8 carbon atoms or alkylamino with a total of up to 8 carbon atoms, phenyl, phenyl which is optionally substituted by chlorine, methyl, ethyl, β-hydroxyethyl, or methoxy, cyclohexyl, benzyl, phenylethyl or ω-N-pyrrolidonylalkyl with 2 or 3 carbon atoms in the alkyl radical, $R'_1$ denotes hydrogen, alkyl with 1 to 8 carbon atoms, or alkyl which is optionally substituted by hydroxyl, alkoxy with 1 to 8 carbon atoms or alkylamino with a total of 8 carbon atoms, and $R'$ and $R'_1$ together with the nitrogen atom denote the radical of pyrrolidine, piperidine, morpholine, piperazine or N-methylpiperazine, and, independently of one another, $R'_2$ has the same meaning as $R'$, $R'_3$ has the same meaning as $R'_1$ and $R'_2$ and $R'_3$ have the same meaning as $R' + R'_1$.

Examples of the last-mentioned coupling components are:

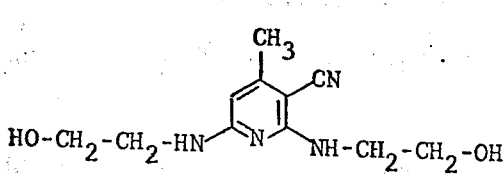

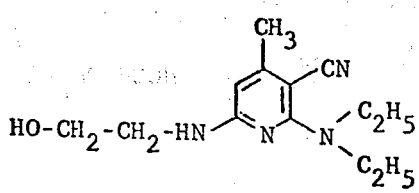

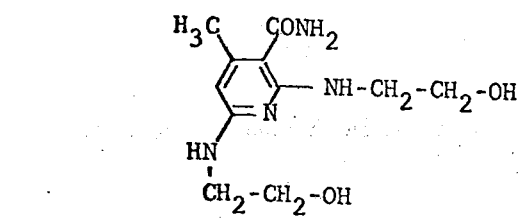

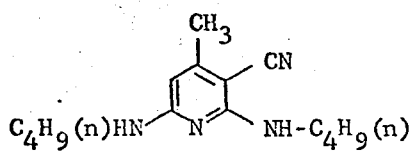

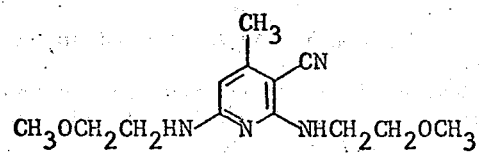

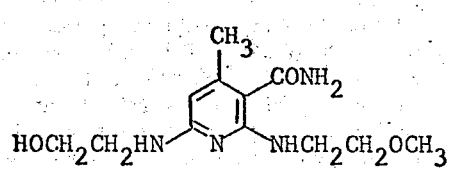

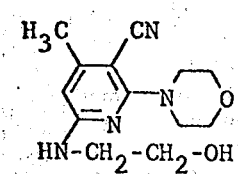

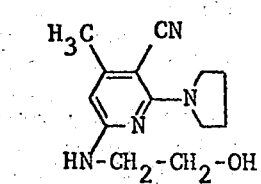

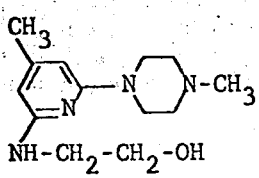

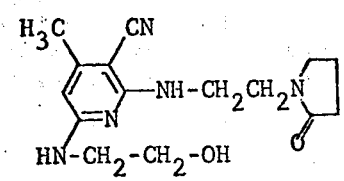

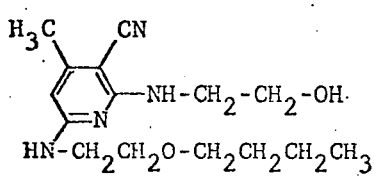 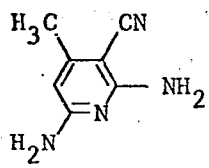

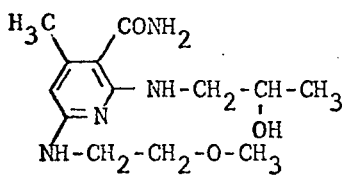 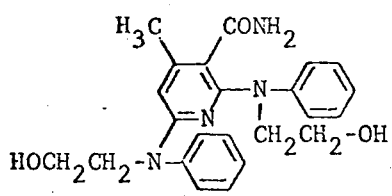

Preferred examples are the coupling components of the formula

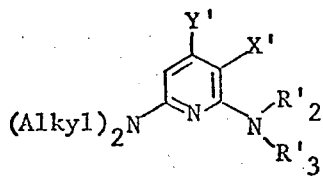

wherein $R'_2$, $R'_3$, $Y'$ and $X'$ represent the same as above.

Instead of a single diazo component, it is also possible to use a mixture of two or more of the diazo components according to the invention.

The coupling of the diazonium compound of an amine of the formula II with the pyridine coupling component of the formula III is carried out according to customary methods, preferably in an acid, aqueous or organic-aqueous medium, in particular at a pH value of 2 to 6. To isolate the coupling product, the acid is gradually buffered, for example with alkali metal salts of lower fatty acids, such as sodium acetate, if the coupling is carried out in the presence of mineral acid.

The reaction of the coupling product (azo compound) of the formula IV, with elimination of YH and cyclisation, to give a polycyclic compound of the formula I, can be carried out, for example, by heating the coupling product in inert organic solvents which boil above 100°C, but preferably, if appropriate, by heating in an acid, aqueous or aqueous-organic medium.

The coupling product can be reacted further direct, without isolation, by heating the acid coupling mixture. In some cases it is appropriate first to isolate the coupling product. The isolated product is then advantageously introduced into an organic solvent or into an acid, aqueous, aqueous-organic or organic solution, and is cyclised by subsequent heating to give a polycyclic compound of the formula I.

Depending on the nature of the reaction medium, the reaction temperature can be between 50° and 150°C.

Suitable organic solvents are water-miscible organic solvents, especially lower alcohols, such as methanol, ethanol or isopropanol, ethylene glycol monomethyl ether or monoethyl ether, cyclic ethers, such as dioxane or tetrahydrofurane, amides of lower fatty acids, such as dimethylformamide, or lower aliphatic sulphoxides, such as dimethylsulphoxide.

Examples of suitable organic and inorganic acids are lower fatty acids such as acetic acid or formic acid, hydrochloric acid, sulphuric acid, phosphoric acid or nitric acid.

The reaction can also be carried out by heating the isolated coupling product in a high-boiling organic solvent to 100°–150°C. Examples of suitable high-boiling organic solvents are optionally halogenated or nitrated aromatic hydrocarbons, such as toluene, xylenes, chlorobenzene, o-dichlorobenzene and nitrobenzene, and higher alcohols, such as amyl alcohol, cyclohexanol or benzyl alcohol.

Those of the new compounds which contain a quaternised amino group can be obtained by quaternising the corresponding dyestuffs which contain a non-quaternised amino group, by treatment with alkylating agents.

As such alkylating or quaternising agents it is possible to use, for example: Esters of strong mineral acids or organic sulphonic acids, for example dimethyl sulphate, diethyl sulphate, alkyl halides, for example methyl chloride, methyl bromide or methyl iodide, aralkyl halides, for example benzyl chloride, esters of low molecular alkanesulphonic acids, such as, for example methyl esters of methanesulphonic acid, ethanesulphonic acid or butanesulphonic acid, and esters of benzenesulphonic acids which can possess additional substituents, for example the methyl, ethyl, propyl or butyl esters of benzenesulphonic acid; further suitable quaternising agents are $\alpha,\beta$-unsaturated compounds, such as methacrylic acid amide, vinyl ethyl ketone, vinyl ethyl ether and above all acrylic acid amide, these compounds being used, together with an acid, as proton donors, examples of the acid being pure acetic acid, sulphuric acid or hydrogen chloride. Further quaternising agents are oxonium salts, such as, for example, triethyleneoxonium fluoborate.

The alkylation is suitably carried out by warming in an inert organic solvent, for example hydrocarbons, such as benzene, toluene or xylene, halogenated hydrocarbons, such as carbon tetrachloride, tetrachloroethane, chlorobenzene or o-dichlorobenzene, or nitrohydrocarbons, such as nitromethane, nitrobenzene or nitronaphthalene. Acid anhydrides, acid amides or nitriles, such as acetic anhydride, dimethylformamide or acetonitrile, or dimethylsulphoxide, can also be used as solvents in the alkylation. Instead of a solvent, a large excess of alkylating agent can also be used. In that case it is however necessary to take care that the mixture should not heat up excessively, since the reaction is strongly exothermic. Nevertheless it is necessary in most cases, especially in the presence of organic solvents, to warm the reaction mixture externally in order to initiate the reaction. In special cases, the alkylation can also be carried out in an aqueous medium or using an alcohol, if necessary in the presence of small amounts of potassium iodide.

If purification of the salts is necessary, it is suitably carried out by dissolving them in water, whereupon any unconverted starting dyestuff can be filtered off as an insoluble residue. The dyestuff can again be separated out from the aqueous solution by adding water-soluble salts, for example sodium chloride.

The non-quaternised dyestuffs are as a rule waterinsoluble.

Representative examples of quaternised dyestuffs are, for example, those of the formulae

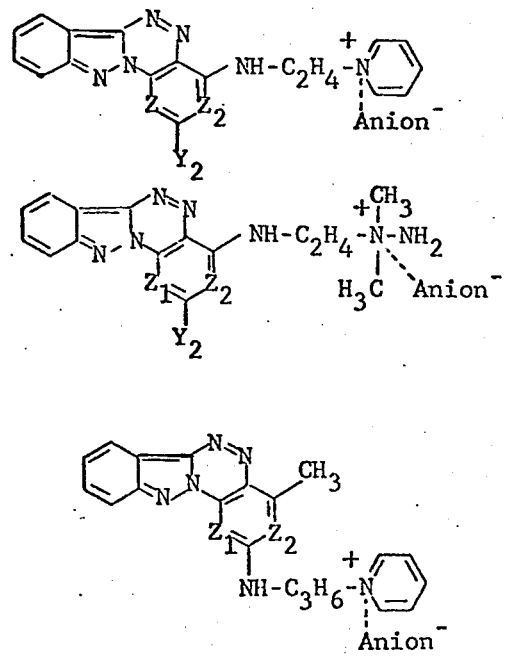

The new polycyclic compounds of the formula I in most cases cyrstallise out from the reaction mixture. They are isolated by filtration or by removing the organic solvent by distillation or steam distillation and can, if necessary, be purified by recrystallisation, for example, from dimethylformamide, ethanol, isopropanol or chlorobenzene. Polycyclic compounds according to the invention, of the formula I, which do not contain any groups which dissociate in water to give an acid reaction, such as sulphonic acid groups are sparingly soluble or insoluble in water. On the other hand, they are soluble in organic solvents, such as dioxane, ethylene glycol monomethyl ether, dimethylformamide, dimethylsulphoxide, chlorobenzene, o-dichlorobenzene, ethanol, isopropanol and chloroform and the organic solutions of these new polycyclic compounds exhibit a yellow-green fluorescence in ultra-violet light and in daylight.

The new compounds, their mixtures with one another and their mixtures with other azo dyestuffs are outstandingly suitable for dyeing and printing leather, wool and silk, and above all synthetic fibres such as, for example, acrylic fibres or acrylonitrile fibres, polyacrylonitrile fibres and copolymers of acrylonitrile and other vinyl compounds, such as acrylic esters, acrylamides, vinylpyridine, vinyl chloride or vinylidene chloride, copolymers of dicyanoethylene and vinyl acetate, and also acrylonitrile block copolymers, fibres of polyurethanes, polyolefines, such as basemodified, nickel-modified or unmodified polypropylene, cellulose triacetate and cellulose 2½-acetate and especially fibres of polyamides, such as nylon-6, nylon-6,6 or nylon-12 and of aromatic polyesters, such as those from terephthalic acid and ethylene glycol or 1,4-dimethylolcyclohexane, and copolymers from terephthalic acid and isophthalic acid and ethylene glycol.

The new dyestuffs which are free of sulpho groups and quaternised nitrogen atoms are particularly suitable for dyeing textile material consisting of high molecular organic esters, such as cellulose 2½-acetate or cellulose triacetate, but especially for dyeing or printing textile material of polymeric esters of aromatic polycarboxylic acids with polyhydric alcohols, above all of polyethylene glycol terephthalate or polycyclohexanedimethylol terephthalate, or texturised polyester fibres, such as, for example, DIOLEN LOFT (Vereinigte Glanzstoff-Werke), CRIMPLENE (ICI), and SCHAPIRA (Hoechst). The dyestuffs can, however, also be used for dyeing synthetic polyamide fibres, such as those of polyhexamethyleneadipamide, polycaprolactam or polyaminoundecanoic acid, and for dyeing polyolefines, especially polypropylene fibres. They belong to the category of the disperse dyestuffs as defined, for example, in the Colour Index.

In addition, they are suitable for the bulk dyeing or pigmenting of lacquers, oils and waxes and of cellulose derivatives, especially cellulose esters, such as cellulose acetate.

The dyeing of the fibre materials mentioned with the sparingly water-soluble azo dyestuffs according to the invention is preferably carried out from aqueous dispersion. If the dyestuffs according to the invention contain hydrophilic groups, such as, for example, one or more hydroxyalkyl, carbonamide or sulphonamide groups, in the diazo component, they are best applied from a solvent liquor. It is therefore desirable finely to divide the dyestuffs according to the invention which can be used as disperse dyestuffs by grinding them with textile auxiliaries such as, for example, dispersing agents, and possibly further grinding auxiliaries. Subsequent drying gives dyestuff preparations consisting of the textile auxiliary and the dyestuff.

The following may be mentioned as examples of advantageously usable dispersing agents from the nonionic group: Addition products of 8 mols of ethylene oxide to 1 mol of p-tert.-octylphenol, of 15 or 16 mols of ethylene oxide to castor oil and of 20 mols of ethylene oxide to the alcohol $C_{16}H_{33}OH$, ethylene oxide addition products to di[α-phenyl-ethyl]-phenols, polyethylene oxide tert.-dodecyl-thioether, polyamine-polyglycol ethers or addition products of 15 or 30 mols of ethylene oxide to 1 mol of amine $C_{12}H_{25}NH_2$ or $C_{18}H_{37}NH_2$.

As anionic dispersing agents there may be mentioned: Sulphuric acid esters of alcohols or the fatty series with 8 to 20 carbon atoms, of the ethylene oxide adducts of the corresponding fatty acid amides, or of alkylated phenols with 8 to 12 carbon atoms in the alkyl radical; sulphonic acid esters with alkyl radicals with 8 to 20 carbon atoms, sulphation products of unsaturated fats and oils; phosphoric acid esters with alkyl radicals with 8 to 20 carbon atoms; fatty acid soaps and also alkylarylsulphonates, condensation products of formaldehyde with naphthalenesulphonic acid, and ligninsulphonates.

Suitable cationic dispersing agents are quaternary ammonium compounds which contain alkyl or aralkyl radicals with 8 to 20 carbon atoms.

In addition to the dispersing agents the dyestuff preparations can also contain organic solvents, especially solvents boiling above 100°C, which are preferably miscible with water, such as monoalkyl glycol esters and dialkyl glycol ethers, dioxane, dimethylformamide or dimethylacetamide, tetramethylenesulphone or dimethylsulphoxide. Advantageously, the dyestuff, dispersing agent and solvent can be ground with one another.

The polyester fibres are dyed with the sparingly water-soluble dyestuffs according to the invention from aqueous dispersion in accordance with the processes customary for polyester materials. Polyesters of aromatic polycarboxylic acids with polyhydric alcohols are preferably dyed at temperatures of above 100°C under pressure. However, the dyeing can also be carried out at the boiling point of the dye bath in the presence of dyestuff carriers, for example alkali metal phenyl-phenolates, polychlorobenzene compounds or similar auxiliaries, or by the padding process and subsequent hot after-treatment, for example thermofixing at 180° to 210°C. Cellulose 2½-acetate fibres are preferably dyed at temperatures of 80° to 85°C, whilst cellulose triacetate fibres and synthetic polyamide fibre material are advantageously dyed at the boil of the dye bath. When dyeing the last-mentioned types of fibres, the use of dyestuff carriers is superfluous.

The dyeings obtained in accordance with the present process can be subjected to an after-treatment, for example by heating with an aqueous solution of a non-ionic detergent.

The printing of the textile materials mentioned is also carried out according to the customary methods, for example by printing the goods with the printing paste, which in addition to the dyestuff and the dyeing accelerator also contains thickeners and customary additives, such as, for example, urea, and subsequently fixing the dyestuff by steaming for 15 minutes at 100° to 130°C.

Furthermore it is possible, for example, to dye synthetic fibres, such as polyesters and polyamides, in organic solvent liquors, such as in a mixture of perchloroethylene and dimethylformamide or methanol, or in pure perchlorroethylene, or perchloroethylene-water emulsions.

The polycyclic compounds of the formula I usable as disperse dyestuffs are absorbed very well on the above-mentioned hydrophobic organic fibre material, especially on polyethylene glycol terephthalate fibres, and give, on this fibre material, pure, strong greenish-tinged yellow, yellow and reddish-tinged yellow of high brilliance and fluorescence. In addition, the dyeings have good fastness to washing, fulling, rubbing, perspiration, solvents, decatising, light and sublimation.

Polycyclic compounds according to the invention, of the formula I, are in particular distinguished by high tinctorial strength and brilliance coupled with very good fastness to light, and to sublimation, of their dyeings on polyethylene glycol terephthalate fibres, and in addition display good levelling properties on texturised polyester fibres.

Those new compounds of the formula I which contain groups which dissociate in water to give an acid reaction, for example sulphonic acid groups, can be used for dyeing or printing natural polyamide fibres, such as wool or synthetic polyamide fibres, such as nylon, as well as texturised polyamide fibres, such as Banlon, from an acid to neutral bath.

The quaternised dyestuffs or dyestuff salts obtained according to the invention and containing an optionally quaternised amino, hydrazino or etherified hydroxylamino group or nitrogen-containing heterocyclic group are suitable for dyeing and printing the most diverse fully synthetic fibres, such as, for example, polyvinyl chloride, polyamide and polyurethane fibres and also fibres of polyesters of aromatic dicarboxylic acids, such as, for example, acid-modified polyethylene terephthalate fibres, but especially polyacrylonitrile fibres or polyvinylidene cyanide fibres.

By polyacrylonitrile fibres there are above all understood polymers which contain more than 80%, for example 80 to 95%, of acrylonitrile; in addition, they contain 5 to 20% of vinyl acetate, vinylpyridine, vinyl chloride, vinylidene chloride, acrylic acid, acrylic acid esters, methacrylic acid, methacrylic acid esters and the like.

The quaternised dyestuffs in general are of low sensitivity towards electrolytes and are soluble in water or polar solvents. The dyeing with the quaternised water-soluble dyestuffs is in general carried out in an aqueous, neutral or acid medium, at the boil under atmospheric pressure or in a closed vessel under elevated temperature and elevated pressure.

They can also be applied to the fibrous materials by printing. For this purpose, for example, a printing paste is used, which contains the dyestuff in addition to the auxiliaries customary in printing. They are furthermore also suitable for bulk dyeing of polymerisation products of acrylonitrile and also of other plastic, optionally dissolved, compositions, to give shades which are fast to light and to washing, and also for dyeing oil paints or lacquers, and finally also for dyeing cellulose, regenerated cellulose, paper and especially mordanted cotton.

In the example which follow the parts, unless otherwise stated, denote parts by weight and the percentages denote percentages by weight.

EXAMPLE 1

3.56 parts of 3-amino-5-nitroindazole are dissolved in 30.6 parts of concentrated sulphuric acid and the solution is diluted with 7.3 parts of 50% strength sulphuric acid. 6.1 parts of 42% strength nitrosylsulphuric acid are then added dropwise at 5° to 10°C and the mixture is stirred for a further 1½ hours at the same temperature. A solution of 4.1 parts of 2-amino-4,6-bis-dimethylamino-5-cyanopyridine in 16 parts of glacial acetic acid is added dropwise at 0° to 5°C to the diazo solution obtained above and the mixture is stirred for a further 12 hours. The coupling mixture is diluted with 500 parts of ice water and the azo compound which precipitates is filtered off, washed with water and dried.

3.94 parts of the azo compound obtained above are suspended in 300 parts of alcohol and 1.5 parts by volume of concentrated hydrochloric acid are added. The mixture is boiled under reflux until the starting product is no longer detectable in the thin layer chromatogram. The suspension is cooled. The finely crystalline yellow precipitate formed is filtered off, washed with water and dried. The yellow dyestuff of the formula

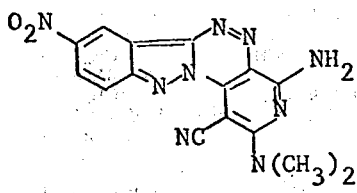

is obtained, which dyes polyester fibres in pure fluorescent yellow shades of very good fastness properties.

2-Amino-4,6-bis-dimethylamino-5-cyanopyridine, used as the coupling component, is obtained by reacting 2-chloro-4,6-bis-dimethylamino-5-cyanopyridine with ammonia in an autoclave at 170° to 180°C.

EXAMPLE 2

If, in Example 1, instead of 4.1 parts of 2-amino-4,6-bis-dimethylamino-5-cyanopyridine, 4.66 parts of 2,4,6-tris-dimethylamino-5-cyanopyridine are used and the procedure described in Example 1 is followed, a yellow dyestuff mixture is obtained, the composition of which corresponds to the formulae

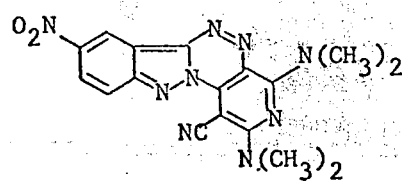

and

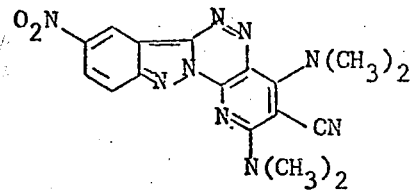

This dyestuff mixture dyes polyester fibres in strong fluorescent yellow shades of very good fastness properties.

The coupling component is obtainable by heating 2-chloro-4,6-bis-dimethylamino-5-cyanopyridine and dimethylamine.

EXAMPLE 3

8.9 parts of 3-amino-5-nitroindazole are introduced into 150 parts of water, with addition of a few drops of a dispersing agent, and 35 parts by volume of concentrated hydrochloric acid are added. The mixture is warmed to 75°C whilst stirring, which produces a solution which is subsequently cooled to 10°C, 20 parts of crushed ice are added and the diazotisation is carried out at about 2° to 5°C with a solution of 3.5 parts of sodium nitrite in 10 parts of water. A solution of 10.2 parts of 2,6-bis-dimethylamino-5-cyano-4-methylpyridine in glacial acetic acid is added to this diazo suspension. After completion of coupling, the mixture is diluted with water and the azo compound produced is filtered off, washed with water and dried.

3.93 parts of the azo compound obtained above, in 120 parts of ethylene glycol monomethyl ether, with the addition of 1.5 parts by volume of concentrated hydrochloric acid, are stirred for 3 hours at about 95°C. The reaction mixture is then cooled and poured into 400 parts of water. The dyestuff which precipitates is filtered off, washed with water and dried. The dyestuff of the formula

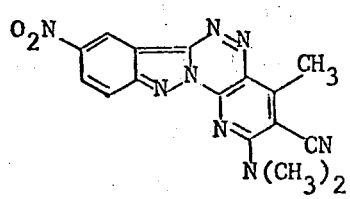

dyes polyester fibres in luminous green-yellow fluorescent fast shades. The dyestuffs of Table I are obtained analogously.

Table 1

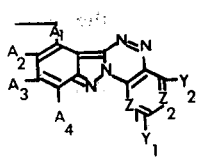

| No. | $A_1$ | $A_2$ | $A_3$ | $A_4$ | $Z_1$ | $Z_2$ | $Y_1$ | $Y_2$ | Shade on polyester |
|---|---|---|---|---|---|---|---|---|---|
| 1 | H | $NO_2$ | H | $NO_2$ | $\geq$C—CN | —N= | $N(CH_3)_2$ | $NH_2$ | Reddish-tinged yellow |
| 2 | " | " | " | H | " | " | $N(C_2H_5)_2$ | $NHCH(CH_3)_2$ | Yellow |
| 3 | " | " | " | " | " | " | $N(C_4H_9)_2$ | $NHC_6H_5$ | " |
| 4 | " | $SO_2N(C_2H_5)_2$ | " | " | " | " | N(H) | $NHC_3H_6OCH(CH_3)_2$ | " |
| 5 | " | CN | " | " | " | " | $N(C_2H_5)_2$ | $N(C_2H_5)_2$ | " |
| 6 | " | H | Br | " | " | " | N(H) | $NHC_2H_4OH$ | " |
| 7 | $CH_3$ | H | $CH_3$ | H | " | " | $N(C_2H_5)_2$ | $NHCH_2C_6H_5$ | " |
| 8 | H | $NO_2$ | H | $NO_2$ | —N= | $\geq$C—CN | $NHC_2H_5$ | $CH_3$ | " |
| 9 | " | " | " | H | " | " | $NH_2$ | $C_4H_9$ | " |
| 10 | " | H | " | " | " | $\geq$C—$CONH_2$ | $NHCH_3$ | $C_6H_5$ | " |
| 11 | " | $OCH_3$ | Cl | " | $\geq$C—$CONH_2$ | —N= | $N(CH_3)_2$ | $NHC_6H_3(CH_3)_2$o.p | " |
| 12 | " | H | H | " | $\geq$C—CN | " | " | $NHC_6H_{13}$ | " |
| 13 | " | CN | " | CN | " | " | " | $N(C_2H_4OCOCH_3)_2$ | " |
| 14 | " | $OCH_3$ | Cl | H | —N= | $\geq$C—CN | $NHC_2H_4C_6H_5$ | $CH_3$ | " |
| 15 | " | $SO_2C_2H_5$ | H | $NO_2$ | $\geq$C—CN. | —N= | $N(C_3H_7)_2$ | $OC_6H_{13}$ | " |
| 16 | Cl | H | " | H | $\geq$C—$CONH_2$ | —N= | N(H) | N(H) | " |
| 17 | H | $NO_2$ | " | " | $\geq$C—CN | " | $N(C_2H_5)_2$ | $SC_6H_5$ | " |
| 18 | " | $SO_2N(C_2H_5)_2$ | " | " | " | " | $N(CH_3)_2$ | $NHC_6H_4Cl$—p | " |
| 19 | " | CN | " | " | " | " | " | $SC_6H_4CH_3$—p | " |
| 20 | " | " | Cl | " | —N= | $\geq$C—CN | $NHC_6H_5$ | $CH_3$ | " |
| 21 | " | $NO_2$ | H | " | $\geq$C—CN | —N= | $N(CH_3)_2$ | $OC_6H_5$ | " |
| 22 | " | $SO_2N(CH_3)_2$ | " | " | —N= | $\geq$C—CN | $NHC_3H_6OCH_3$ | $CH_3$ | " |
| 23 | $CH_3$ | H | $CH_3$ | " | $\geq$C—CN | —N= | $N(CH_3)_2$ | $N(C_2H_4OH)_2$ | " |
| 24 | H | $NO_2$ | H | " | —N= | $\geq$C—CN | $NHC_4H_9$ | $CH_3$ | " |
| 25 | " | $SO_2CH_3$ | " | $NO_2$ | $\geq$C—CN | —N= | $N(CH_3)_2$ | $NHC_2H_6OC_2H_5$ | " |
| 26 | " | $NO_2$ | " | H | " | " | " | $NHC_6H_4Br$—m | " |
| 27 | " | " | " | " | " | " | " | $SC_6H_{13}$ | " |
| 28 | " | " | " | " | —N= | $\geq$C—CN | $N(C_4H_9)_2$ | $CH_3$ | " |
| 29 | " | $SO_2N(CH_3)_2$ | " | C" | $\geq$C—CN | —N= | $N(CH_3)_2$ | NHCyclohexyl | " |
| 30 | " | H | Cl | " | " | " | " | N(H)NCOOH_3 | " |
| 31 | " | Br | H | " | " | " | $N(C_3H_7)_2$ | N(H)O | " |
| 32 | " | $NO_2$ | " | Cl | $\geq$C—CN | " | $N(C_2H_5)_2$ | NHCH (H)O | " |
| 33 | " | Br | " | H | —N= | $\geq$C—CN | $NHC_6H_4OCH_3$—p | $CH_3$ | " |
| 34 | " | CN | " | " | " | " | $NHCH_2$(furyl) | " | " |
| 35 | " | $NO_2$ | " | " | " | " | $NHCH(CH_3)_2$ | $NHCH(CH_3)_2$ | " |
| 36 | " | " | " | $NO_2$ | " | " | $NHCH_3$ | $NHCH_3$ | " |
| 37 | $CH_3$ | CN | $CH_3$ | " | " | " | $NHC_2H_5$ | $NHC_2H_5$ | " |
| 38 | H | H | $OCH_3$ | H | " | " | NH—cyclohexyl | NH—cyclohexyl | " |
| 39 | " | Cl | H | " | " | " | N(H) | $CH_3$ | " |
| 40 | " | Br | " | " | " | " | $NHC_3H_7$ | $C_4H_9$ | " |
| 41 | " | H | Cl | " | " | " | $NH_2$ | $CH_3$ | " |
| 42 | " | $NO_2$ | H | H | " | " | $NHCH(CH_3)_2$ | " | " |
| 43 | " | " | " | " | " | " | —N(  )N—$CH_3$ | " | " |
| 44 | " | H | Cl | " | " | " | —$NHC_2H_4OH$ | $CH_3$ | " |
| 45 | " | $NO_2$ | H | " | " | " | —$NHCH_2CH(CH_3)_2$ | " | " |
| 46 | " | H | Cl | " | " | " | $N(C_2H_5)(C_2H_4OCOCH_3)$ | $CH_3$ | " |
| 47 | H | $NO_2$ | H | H | " | " | $NHCH_2C_6H_5$ | " | " |
| 48 | " | " | " | " | " | " | $N(C_2H_4OCOCH_3)_2$ | " | " |
| 49 | " | H | Cl | " | " | " | " | " | " |
| 50 | " | " | " | " | " | " | —$NHCH_2CH(CH_3)_2$ | " | " |

EXAMPLE 4

8.37 parts of 3-amino-6-chloroindazole are introduced into 150 ml of water with addition of a few drops of a dispersing agent, and 35 parts by volume of concentrated hydrochloric acid are added. The mixture is warmed to 75°C whilst stirring and is then cooled to 5°C, 20 parts of crushed ice are added and the diazotisation is carried out at 0° to 5°C with a solution of 3.5 parts of sodium nitrite in 10 parts of water. A solution of 14.5 parts of 4,6-bis-dimethylamino-2-dimethylaminopropylamino-5-cyanopyridine in 20 parts of water and 7.5 parts of concentrated hydrochloric acid is added to this diazo solution. After completion of coupling, the mixture is heated to 95°–100°C until the azo compound has cyclised to give a polycyclic compound (as tested by means of a thin layer chromatogram). The reaction mixture is allowed to cool and its pH is adjusted to 8 – 9 with sodium hydroxide solution. The dyestuff which precipitates is filtered off, washed with water and dried.

8.47 parts of the product obtained above are dissolved in 500 parts of hot dimethylformamide. 1.5 parts of dimethyl sulphate, dissolved in 5 parts of dimethylformamide, are added dropwise and the reaction mixture is stirred for a further 3 hours at 95° to 100°C. The solvent is distilled off in vacuo. The residue is dissolved in hot water and after filtration of the solution the product is salted out from the filtrate with sodium chloride.

The dyestuff which precipitates, of the formula

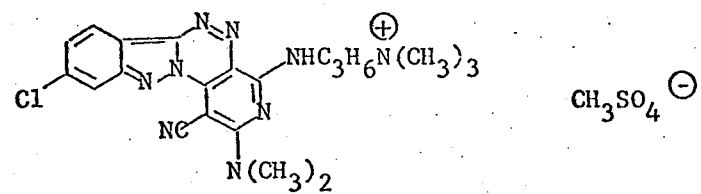

is filtered off and dried. It dyes polyacrylonitrile fibres in fluorescent yellow shades.

The dyestuffs with a quaternised nitrogen atom listed in Table 2 which follows are obtained analogously; they dye polyacrylonitrile fibres in the indicated shades.

Table 2

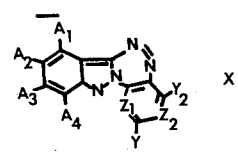

| No. | $A_1$ | $A_2$ | $A_3$ | $A_4$ | $Z_1$ | $Z_2$ | $Y_1$ | $Y_2$ | X | Shade on polyester |
|---|---|---|---|---|---|---|---|---|---|---|
| 1 | H | $SO_2C_2H_5$ | H | $NO_2$ | >C—$CONH_2$ | —N= | $N(C_2H_5)_2$ | $NHC_3H_6N(CH_3)_2$ \| $CH_2C_6H_5$ | $CH_3COO$ | Yellow |
| 2 | " | $NO_2$ | " | H | >C—CN | " | $N(CH_3)_2$ | $NHC_2H_4N\bigcirc$ | Cl | " |
| 3 | " | CN | " | CN | " | " | $-N\boxed{H}$ | $NHC_2H_4N$—$C_2H_5$ \| $OC_4H_9$ | Br | " |
| 4 | " | $NO_2$ | " | $NO_2$ | " | " | $N(C_3H_7)_2$ | $NHC_2H_4N(CH_3)_2$ \| $NH_2$ | $CH_3SO_3$ | Reddish-tinged yellow |
| 5 | " | Br | " | H | —N= | >C—CN | $NHC_3H_6N(CH_3)_2$ | $CH_3$ | $C_6H_5SO_3$ | Yellow |
| 6 | $CH_3$ | H | $CH_3$ | " | >C—$CONH_2$ | —N= | $N(C_4H_9)_2$ \| $OCH_3$ | $SC_2H_4N(C_2H_5)_2$ \| $C_2H_4CONH_2$ | Br | " |
| 7 | H | " | Br | " | >C—CN | " | " | $OC_6H_2N\bigcirc$ | $C_7H_7SO_3$ | " |
| 8 | " | $NO_2$ | H | " | —N= | >C—CN | $NHC_2H_4N(C_2H_5)_3$ | $CH_3$ | I | " |
| 9 | " | $OCH_3$ | Cl | " | " | " | $NHC_2H_4OCOCH_2N\bigcirc$ | $C_6H_5$ | Cl | " |
| 10 | Cl | H | H | " | >C—CN | —N= | $N(CH_3)_2$ | $NC_2H_4N\bigcirc O$ \| $C_2H_4COOC_2H_5$ | $1/3 PO_4$ | " |

Table 2-continued

| No. | A₁ | A₂ | A₃ | A₄ | Z₁ | Z₂ | Y₁ | Y₂ | X | Shade on polyester |
|-----|----|----|----|----|----|----|----|----|----|---------|
| 11 | H | $SO_2N(C_2H_5)_2$ | H | H | $\geq$C—CN | —N= | $N(CH_3)_2$ | $NHC_2H_4N\!\!\diagup\!\!\diagdown\!\!N\text{-}C_4H_9$ | $HSO_4$ | " |
| 12 | " | CN | " | " | —N= | $\geq$C—CN | $NHC_2H_4N\!\!\diagup\!\!\diagdown\!\!H$, $NH_2$ | $C_4H_9v$ | $CH_3SO_3$ | " |
| 13 | " | " | " | " | $\geq$C—CN | —N= | $N(CH_3)_2$ | $NHC_3H_6N(CH_3)_2$, $C_2H_4OH$ | $H_2SO_3$ | " |
| 14 | $CH_3$ | " | $CH_3$ | $NO_2$ | —N= | $\geq$C—CN | $NHC_6H_4CH_2N(CH_3)_2$–p | $CH_3$, $C_2H_5$ | $C_2H_5SO_4$ | " |
| 15 | H | $NO_2$ | H | " | " | " | $NHC_2H_4N\!\!\diagup\!\!\diagdown\!\!N\text{-}C_2H_5$ | $CH_3$ | $C_2H_5SO_4$ | " |
| 16 | " | " | " | Cl | $\geq$C—CN | —N= | $N(CH_3)_2$ | $N\!\!\diagup\!\!H\!\!\diagdown\!\!N(CH_3)_2$ | $CH_3SO_4$ | " |
| 17 | " | " | " | H | " | " | " | $NHCH_2\!\!\diagup\!\!\diagdown\!\!N, CH_3$ | $C_7H_7SO_3$ | " |
| 18 | " | H | $OCH_3$ | " | " | " | " | $NHC_3H_6N(C_2H_5)_2$, $OC_2H_5$ | $HCO_3$ | " |
| 19 | " | " | Cl | " | —N= | $\geq$C—CN | $N\!\!\diagup\!\!H\!\!\diagdown\!\!N(CH_3)_2$ | $CH_3$ | $CH_3SO_4$ | " |

EXAMPLE 5

If 3-amino-5-nitroindazole is diazotised as indicated in Example 3 and coupled, as indicated in Example 4, with 2-dimethylamino-6-dimethylaminopropylamino-5-cyano-4-methylpyridine, cyclisation is brought about and the product is alkylated with dimethyl sulphate, a dyestuff of the formula

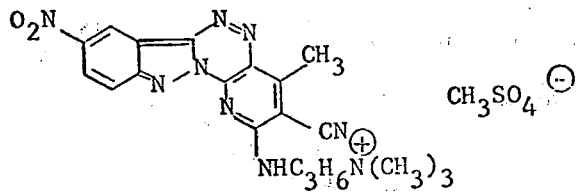

is obtained. It dyes polyacrylonitrile fibres in fluorescent luminous yellow fast shades.

EXAMPLE 6

6.6 parts of 3-aminoindazole are dissolved in 200 parts of water and 18 parts by volume of concentrated hydrochloric acid and diazotised at 0° to 5°C with 50 parts by volume of a 1 N sodium nitrite solution. The resulting diazonium salt solution is allowed to run dropwise into a solution of 18.05 parts of 4,6-bis-dimethylamino-2-(3′-sulphophenylamino)-5-cyanopyridine in 200 parts of methanol and 15 parts by volume of 30% strength sodium hydroxide solution. After completion of coupling, the reaction mixture is acidified with concentrated hydrochloric acid. The mixture is subsequently heated until the methanol has distilled off and is then warmed to about 95°C and kept at this temperature for one hour, whilst stirring. The mixture is cooled to room temperature and the precipitate is filtered off and dried. A dyestuff of the formula

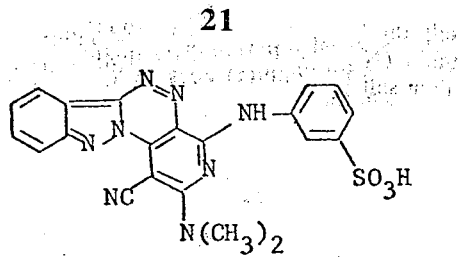

is obtained, which dyes synthetic polyamide fibres and wool in brilliant fluorescent yellow shades.

The coupling component is obtainable by reaction of 2-chloro-4,6-bis-dimethylamino-5-cyanopyridine with metanilic acid.

The acid dyestuffs listed in Table 3 which follows are obtained analogously; they dye polyamide fibres in the indicated shades.

Table 3

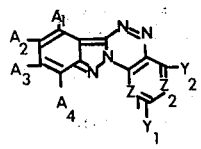

| No. | $A_1$ | $A_2$ | $A_3$ | $A_4$ | $Z_1$ | $Z_2$ | $Y_1$ | $Y_2$ | Shade on polyamide |
|---|---|---|---|---|---|---|---|---|---|
| 1 | H | $SO_2N(CH_3)_2$ | H | H | C—CN | —N= | $N(C_2H_5)_2$ | $NHC_6H_4SO_3H(m)$ | Yellow |
| 2 | " | $SO_2CH_3$ | " | " | —N= | C—CN | $NHC_6H_4SO_3H(m)$ | $CH_3$ | " |
| 3 | " | H | Cl | " | C—$CONH_2$ | —N= | $N(CH_3)_2$ | $NHC_6H_4SO_3H(m)$ | " |
| 4 | " | Br | H | " | —N= | C—CN | $NHC_6H_4SO_3H(m)$ | $C_4H_9$ | " |
| 5 | " | $SO_3H$ | " | " | —C—CN | —N= | $N(CH_3)_2$ | $NH_2$ | " |
| 6 | " | " | " | " | " | " | " | $NHC_6H_4SO_3H(m)$ | " |
| 7 | " | " | " | " | —N= | C—CN | $NHCH_3$ | $CH_3$ | " | lulose triacetate fabric which is dyed under conditions indicated and subsequently rinsed with water, a yellow dyeing of extreme brilliance, and of very good fastness to light and sublimation, is obtained.

EXAMPLE 9

Polyethylene glycol terephthalate fabric (for example "Dacron") is impregnated on a padder at 40°C with a liquor of the following composition: 20 parts by weight of the dyestuff obtained according to Example 1, finely dispersed in 7.5 parts by weight of sodium alginate, 20 parts by weight of triethanolamine, 20 parts by weight of octylphenol polyglycol ether and 900 parts by weight of water. The fabric is squeezed out to an approx. 100% content of impregnating liquor, dried at 100°C and subsequently fixed for 30 seconds at a temperature of 210°C. The dyed goods are rinsed with water, soaped and dried. Under these conditions, a

EXAMPLE 7

2 g of the dyestuff obtained according to Example 1 are finely suspended in 2,000 ml of water which contains 4 g of oleyl polyglycol ether, in a pressure dyeing apparatus. The pH value of the dye bath is adjusted to 5 – 5.5 with acetic acid.

100 g of polyethylene glycol terephthalate fabric are introduced at 50°C, the bath is heated to 140°C over the course of 30 minutes and the fabric is dyed for 50 minutes at this temperature. The dyeing is subsequently rinsed with water, soaped and dried. If these conditions are observed, a pure, fluorescent, yellow dyeing is obtained, which is fast to washing, perspiration, light and sublimation.

The dyestuffs described in the other examples give dyeings of equivalent quality by this process.

EXAMPLE 8

2 g of the dyestuff obtained according to Example 1 are dispersed in 4,000 ml of water. 12 g of sodium o-phenylphenolate as the carrier, and 12 g of diammonium phosphate, are added to this dispersion, and 100 g of polyethylene glycol terephthalate yarn are dyed for 1½ hours at 95° to 98°C. The dyeing is rinsed and aftertreated with dilute sodium hydroxide solution and a dispersing agent.

A brilliant, fluorescent, yellow dyeing is thus obtained, which is fast to washing, light and sublimation.

If, in the above example, the 100 g of polyethylene glycol terephthalate yarn are replaced by 100 g of celbrilliant, fluorescent, greenish-tinged yellow dyeing is obtained, which is fast to washing, rubbing, light and sublimation.

The dyestuffs described in the other examples give dyeings of equivalent quality by this process.

EXAMPLE 10

100 g of "Banlon" knitted fabric (a polyamide fabric) are introduced into a dye bath at 40°C, which contains 1 g of the dyestuff obtained according to Example 6 and 3 ml of 85% strength formic acid in 5,000 ml of water. The bath is heated to the boil over the course of 30 minutes whilst stirring well and dyeing is carried out for one hour at the boil. The dyed goods are then carefully rinsed and dried. A pure, brilliant, deep yellow dyeing is obtained, which exhibits good fastness to light and to perspiration.

EXAMPLE 11

100 g of thoroughly pre-wetted wool are introduced into a dye bath at 50°C, which contains 1 g of the dyestuff obtained according to Example 6, 5 g of sodium sulphate and 3 ml of 40% strength acetic acid in 5,000 ml of water, the bath is heated to the boil over the course of 15 minutes, and the wool is dyed for 1 hour at the boil. A pure, brilliant and fluorescent yellow wool dyeing is obtained.

EXAMPLE 12

1 part of the dyestuff obtained according to Example 5 is dissolved in 5,000 parts of water, with addition of 2 parts of 40% strength acetic acid. 100 parts of dried polyacrylonitrile staple fibre yarn are introduced into this dyebath at 60°C, the temperature is raised to 100°C over the course of half an hour and the yarn is dyed for one hour at the boil. The dyeing is then thoroughly rinsed and dried. A pure brilliant yellow dyeing of very good fastness to light, sublimation and washing is obtained.

What we claim is:

1. A polycyclic compound of the formula

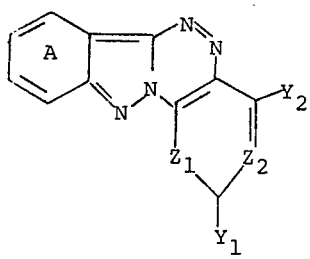

in which the nucleus A is unsubstituted or substituted by nitro, halo, lower alkyl, lower alkoxy, sulpho, cyano, dimethylaminosulphonyl, diethylaminosulphonyl, methylsulphonyl or ethylsulphonyl; one of $Z_1$ and $Z_2$ is -N= and the other is

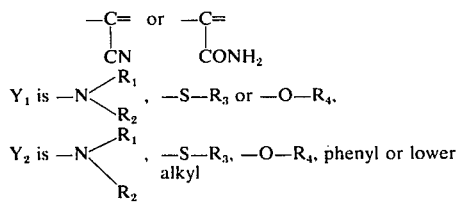

wherein $R_1$, $R_2$, $R_3$ and $R_4$ independently represent
hydrogen,
cyclohexyl,
allyl,
phenyl, unsubstituted or substituted by lower alkyl, lower alkoxy, halo or sulpho;
napthyl,
or
alkyl of up to 12 carbon atoms which is unsubstituted or substituted by lower alkoxy, napthyl, phenyl or phenyl substituted by lower alkoxy, lower alkyl, halo or sulpho; hydroxy, nitrile, lower alkoxy, 2-hydroxyethoxy, furanyl-(2)-, tetrahydropyranyl-(2)-, acyloxy wherein acyl represents alkanoyl of up to 5 carbon atoms, alkylcarbamyl of up to 5 carbon atoms, alkoxycarbamyl of up to 5 carbon atoms, phenylcarbamyl, phenoxycarbonyl, benzoyl, phenoxyacetyl, chloroacetyl or phenylacetyl; N-pyrollidonyl, diloweralkylamino and the quaternary salts thereof, the N-pyridinium quaternary salt, the N-(N-N-dimethyl) hydrazinium quaternary salt, the N-morpholino, N-ethoxycarbonylethyl quaternary ammonium salt, the N-(N,N-pentamethylene) hydrazinium quaternary salt, the N-ethyl pyridinium-(4)-quaternary salt, or the 1-(N-pyridinium) acetoxy quaternary ammonium salt; or

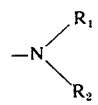

together with $R_1$ and $R_2$ represent represent pyrrolidono, piperdino, morpholino, piperazino, N'-methylpiperazino, N'-ethylpiperazino, N-thiomorpholino-S-dioxide, N'-acetylpiperazino or the N',N'-dimethylpiperazine quaternary salt.

2. A polycyclic compound according to claim 1, wherein $Y_1$ and $Y_2$ are identical or different radicals

wherein $R_1$ is lower alkyl and $R_2$ is hydrogen or lower alkyl.

3. A polycyclic compound according to claim 1, wherein $Y_2$ is lower alkyl.

4. A polycyclic compound according to claim 1, wherein $Y_2$ is methyl.

5. A polycyclic compound according to claim 4, wherein in that at least one of the radicals Y contains a sulphonic acid group.

6. A polycyclic compound according to claim 1, wherein in that the benzene ring A is substituted by sulfo.

7. A polycyclic compound according to claim 1, wherein at least one of the radicals Y contains a quaternary nitrogen atom.

8. A polycyclic compound according to claim 1, free of acid or basic groups.

9. A dyestuff as claimed in claim 8 of the formula

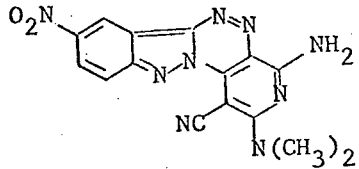

10. A dyestuff as claimed in claim 4 of the formula

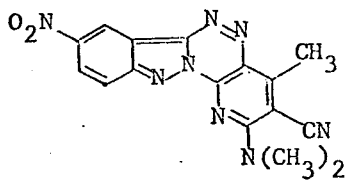

11. A dyestuff as claimed in claim 7 of the formula
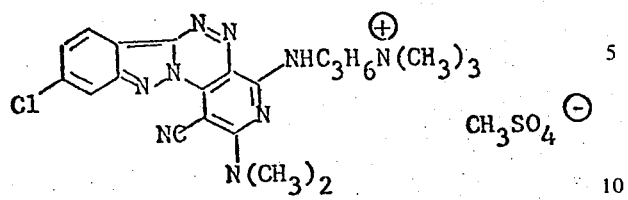
12. A dyestuff as claimed in claim 6 of the formula
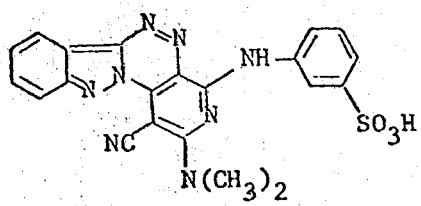
* * * * *